(No Model.)
L. H. WATTLES.
EXHAUST VALVE FOR ENGINES.
No. 526,761. Patented Oct. 2, 1894.
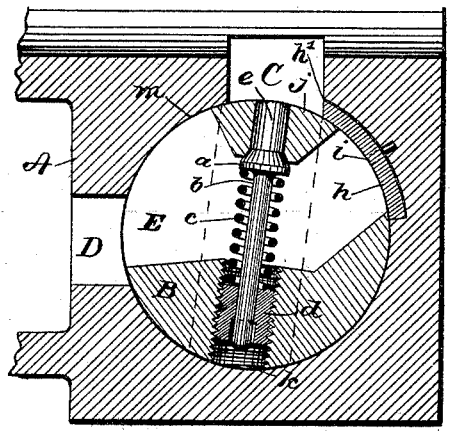
Fig.1.
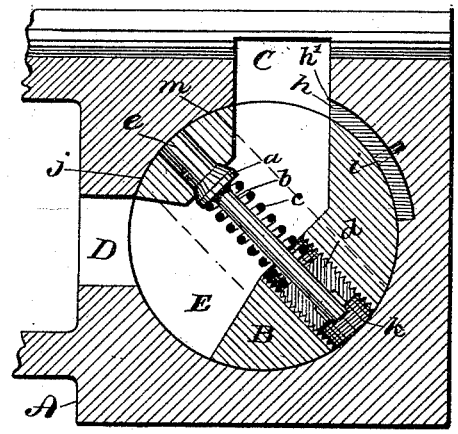
Fig.2.
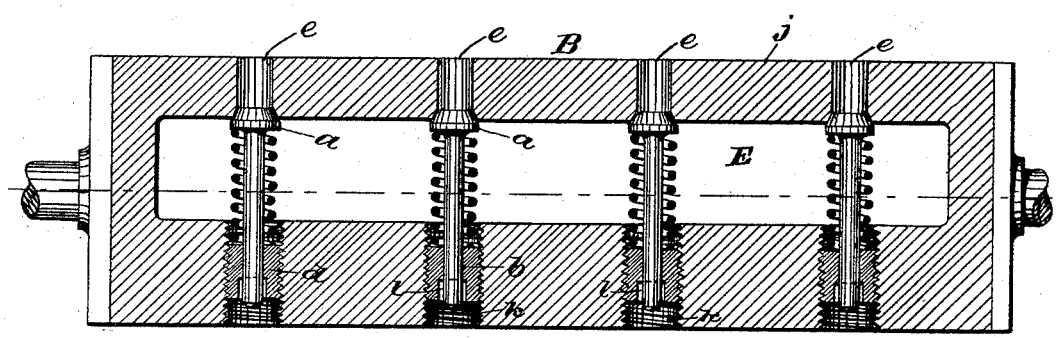
Fig.3.
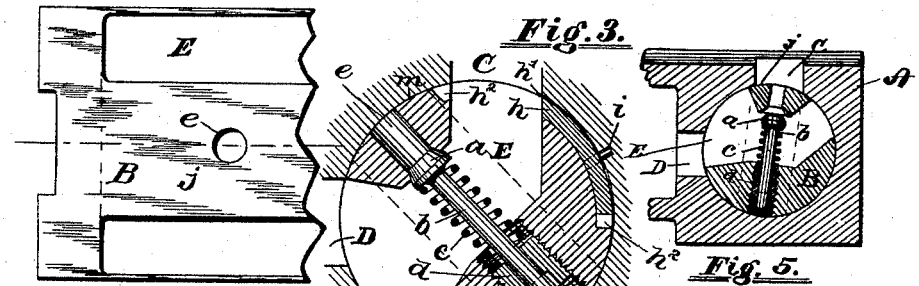
Fig.4.
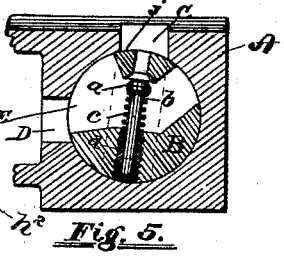
Fig.5.
Fig.6.
Witnesses.
Fred Arnold.
Ida M. Warren.
Inventor.
Luther H. Wattles.
by Remington & Henthorn
Attys.

UNITED STATES PATENT OFFICE.

LUTHER H. WATTLES, OF PROVIDENCE, RHODE ISLAND.

EXHAUST-VALVE FOR ENGINES.

SPECIFICATION forming part of Letters Patent No. 526,761, dated October 2, 1894.

Application filed June 14, 1894. Serial No. 514,595. (No model.)

*To all whom it may concern:*

Be it known that I, LUTHER H. WATTLES, a citizen of the United States, residing at Providence, in the county of Providence and State of Rhode Island, have invented certain new and useful Improvements in Exhaust-Valves for Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a new and improved construction of exhaust valves for steam engines analogous to those of the "Corliss" type, and it consists essentially of a series of spring-actuated relief valves mounted in the valve, whereby any sudden accumulation of water within the steam cylinder from any cause, such as the priming of the boiler to which the engine may be connected, will be instantly discharged from the steam cylinder.

The object of this improvement is to prevent accident to steam engine cylinders, such for example as might result from a rapidly moving piston coming in contact with water that may be confined in the cylinder by the closing of the exhaust outlet.

The presence of water in steam cylinders, as a result of priming of the boilers to which the engine may be connected, is quite common and to relieve the cylinder of such water without damage to the various parts of the engine relief valves have been applied to the heads of the cylinder, ends of the exhaust valves, &c., but such employment of valves is extremely objectionable from the fact that if the relief valve should operate from an abnormal pressure within the cylinder the contents of the cylinder, i. e., hot water and steam, would be discharged into the engine room, and thus endanger the lives of the attendants present, whereas with my improved valve the water and steam would be safely discharged into the exhaust chest of the engine and thence into the exhaust pipe and finally pass into the condenser or into the atmosphere.

To more fully illustrate and describe my improvement I have prepared the annexed sheet of drawings, wherein—

Figure 1— represents a cross-section of my improved exhaust valve having mounted therein the guided and spring sustained relief valves for safely discharging any accumulation of water while the exhaust valve may be in a closed position relative to the exhaust steam port as shown. Fig. 2— is a similar cross-sectional view of the valve, the latter being in an open position for the free exit of the steam from the steam cylinder, the relief valves then being inoperative. Fig. 3— is a longitudinal sectional view of the exhaust valve provided with a series of the several relief valves. Fig. 4— is a plan view of one end of the exhaust valve, showing one of the apertures or ports for the spring relief valve formed in its face. Fig. 5— is a cross-sectional view, similar to Fig. 1, in reduced scale, showing the relief valve open, as in discharging any accumulation of water from within the steam cylinder through the exhaust valve and into the exhaust chest. Fig. 6— is a partial cross-sectional view showing a modified form of the packing plate.

A more detailed description of my invention and the manner of its operation is as follows:

B, referring to the drawings, is my improved cylindrical exhaust-valve adapted to be mounted in the valve-chest forming a part of the steam cylinder A. The valve may be connected with and oscillated by means common to this class of valve. Within the valve there is cast a longitudinal passage or port E arranged to communicate both with the port C of the cylinder and the discharge port D of the exhaust chest during such periods of the valve's travel as are governed by the driving mechanism, or valve gear, and through which port E the exhaust steam passes. See Fig. 2. In the working face $j$ of the valve I drill transversely any desired number of holes $e$, the same extending through the wall of the valve and communicating with the port E. Upon the inside of the valve the holes are counter-bored to form a seat for the relief valves $a$. In what may be termed the back of the valve B, I drill corresponding holes $k$, the latter being screw-threaded to receive the bushings $d$, the outer ends of which are provided with a square or hexagonal hole $l$ to receive a suitable wrench, whereby the bushing may be readily screwed in or out. The bushing is drilled centrally to form a guide for the small valve-stem b. Interposed between the valve a and the inner end of the bushing and surrounding the stem b is mounted a spiral spring c, the tension of the latter exceeding the normal pressure of the steam. By means of this bushing d working within the screw-threaded hole k I can adjust the tension of the springs c to whatever pressure I desire the relief valves a to discharge at, and after being once adjusted and the valve B in place within the cylinder A the determined pressure which the valves a are fixed to discharge at in case of an accumulation of water within the steam cylinder cannot be tampered with or manipulated by inexperienced or unauthorized persons. Consequently the pressure cannot accumulate sufficiently to endanger the various parts of the engine, since the relief valves will automatically open and discharge into the exhaust chest. Again referring to the form and construction of this valve B the waste clearance spaces which are to be filled at each stroke of the engine while the steam is doing work is by this design and construction reduced to a minimum as compared with other exhaust valves of the oscillating type. This feature I deem of great importance in economy. With my improved construction while the steam within the cylinder is doing work, the face j is but a short distance from the working barrel of the cylinder. Hence a material reduction of the waste clearance spaces is effected.

In the bore of the exhaust-valve chest and contiguous to the side of the exhaust port C I form a longitudinal recess in which is seated a curved packing-plate h, the latter being held in place by one or more pins i passing through the same and secured to the cylinder casting. See Figs. 1 and 2. By means of this construction the packing-plate h is practically fixed and forms a part of the cylinder; the valve being adapted to work back and forth beneath and in frictional contact with it. The plate, however, has a slight radial or transverse movement on its supporting pins i.

I would state that usually the valve B is turned a little smaller than the seat formed in the chest in order to allow the steam to lift the valve and thus form a steam-tight joint. In the present arrangement steam enters a small space h' formed at the back of the plate h and presses the latter snugly against the adjacent surface of the valve, thus forming a steam tight joint since the closed valve is thereby forced toward the left into snug engagement with the seat of the chest to prevent the escape of live steam from the cylinder into the port D. See Fig. 1.

In Fig. 6 the bore of the valve-chest is represented as non-recessed, the valve itself in this case being cut away at $h^2$, to freely receive the stationary packing-plate h. By the employment of said plate it will be seen that steam pressing against its back will force it downwardly into engagement with the surface of the valve B thereby forcing the latter toward the left and into snug engagement with the surface m, thus as before stated preventing live steam from escaping into the discharge-port D, when the valve is closed. See also Fig. 1.

I claim as new and desire to secure by United States Letters Patent—

1. An exhaust-valve of the "Corliss" type having a series of spring-resisted relief valves mounted therein adapted in use to discharge water from the cylinder into the exhaust chest, substantially as described.

2. The combination, in a steam engine cylinder, with a mechanically actuated exhaust-valve having a discharge port therethrough, of a series of adjustable self-closing yielding relief valves mounted therein, constructed and arranged whereby an abnormal pressure in the cylinder automatically operates said relief-valves and forms an open passage from the cylinder into the said discharge port of the exhaust-valve, substantially as described.

3. The combination, in a steam engine cylinder, with a mechanically actuated exhaust-valve having a discharge port therethrough adapted to be alternately opened and closed with respect to the exhaust passage from the cylinder, of a series of yielding relief-valves seated in the walls of the valve and opening inwardly into said discharge port, substantially as described.

4. In a steam engine cylinder having an exhaust-chest and exhaust and discharge ports C, D, respectively, communicating with said exhaust chest, the combination therewith of a mechanically actuated cylindrical exhaust valve seated in said chest having a port E therethrough adapted to intermittingly communicate with the exhaust port C, and continuously communicating with the discharge port D, and a series of yielding relief-valves mounted in the exhaust valve and arranged to communicate with the said ports C and E, substantially as described and for the purpose set forth.

5. In a steam engine cylinder provided with an exhaust-chest having exhaust and discharge ports C, D, respectively, the combination therewith of a mechanically actuated exhaust-valve seated therein and arranged to communicate with said ports and a steam actuated packing-plate interposed between the adjacent surfaces of the said chest and valve, said valve working to and fro beneath and in frictional contact with the packing-plate, substantially as described and for the purpose set forth.

In testimony whereof I have affixed my signature in presence of two witnesses.

LUTHER H. WATTLES.

Witnesses:
GEO. H. REMINGTON,
IDA M. WARREN.